(12) United States Patent
Escoda et al.

(10) Patent No.: US 7,307,358 B2
(45) Date of Patent: Dec. 11, 2007

(54) SYSTEM AND METHOD OF ACTIVE EQUALIZATION BETWEEN POWER SUPPLY SYSTEMS SHARING A RECHARGEABLE ELECTRICAL POWER STORAGE DEVICE, APPLICABLE TO AN AUTOMOTIVE VEHICLE

(75) Inventors: Jordi Escoda, Tarragon Valls (ES); Joan Fontanilles, Tarragon Valls (ES); Rafael Jimenez, Tarragon Valls (ES)

(73) Assignee: Lear Corporation, Southfield, MI (US)

( * ) Notice: Subject to any disclaimer, the term of this patent is extended or adjusted under 35 U.S.C. 154(b) by 539 days.

(21) Appl. No.: 10/711,921

(22) Filed: Dec. 3, 2004

(65) Prior Publication Data

US 2006/0119179 A1    Jun. 8, 2006

(51) Int. Cl.
    *B60L 1/00*    (2006.01)

(52) U.S. Cl. .................................... 307/10.1
(58) Field of Classification Search ............... 307/10.1
    See application file for complete search history.

(56) References Cited

U.S. PATENT DOCUMENTS

| | | | |
|---|---|---|---|
| 5,969,435 A * | 10/1999 | Wilhelm | 307/64 |
| 2003/0085621 A1 | 5/2003 | Potega | 307/18 |
| 2003/0197484 A1 | 10/2003 | Kotlow et al. | 320/104 |
| 2005/0029867 A1* | 2/2005 | Wood | 307/10.1 |

* cited by examiner

*Primary Examiner*—Robert L. Deberadinis
*Assistant Examiner*—Dru Parries
(74) *Attorney, Agent, or Firm*—Bruce E Harang

(57) ABSTRACT

A system of managing power supply systems in automobiles, particularly a system of active equalization between power supply systems sharing a rechargeable electrical power storage device such as a spare battery.

16 Claims, 2 Drawing Sheets

SYSTEM AND METHOD OF ACTIVE EQUALIZATION BETWEEN POWER SUPPLY SYSTEMS SHARING A RECHARGEABLE ELECTRICAL POWER STORAGE DEVICE, APPLICABLE TO AN AUTOMOTIVE VEHICLE

FIELD OF THE ART

The present invention generally relates to a system of managing power supply systems applicable to an automotive vehicle, and more particularly, to a system of active equalization between power supply systems sharing a rechargeable electrical power storage device, such as a spare battery, applicable to an automotive vehicle.

The invention also relates to a method using the proposed system.

PRIOR STATE OF THE ART

Different electrical systems of automotive vehicles incorporating more than one power supply system for the purpose of feeding different devices differentiated with more than one operating voltage level are known. Lately, the denomination dual voltage has been greatly extended in the automotive world to make reference to vehicles incorporating two batteries of a different voltage.

Patent application US-A-20030085621 proposes a power supply source capable of feeding a device, recharging a battery associated to said device, recharging the battery and at the same time feeding the device, or feeding the device and preventing the battery from recharging. A power supply system is proposed incorporating several power supply sources such as the one proposed, for feeding a plurality of devices associated to respective batteries. The different necessities which electrical devices can have regarding, for example, the time during which they require being fed by the power supply source, or different paths in which said supplying occurs according to the necessities of the device and the deficiencies of the battery associated thereto, are not contemplated in the patent Patent application US-A-20030197484 proposes a method and an apparatus for regulating the electronic equipment consumption of an automotive vehicle, comprising a series of spare batteries associated to said electronic equipment and a series of main batteries associated to the motor of the vehicle. It proposes achieving maintaining the spare batteries charged by means of main batteries in any situation, even when the motor is stopped, to which end corresponding monitoring and control sensors and circuits are provided. The possibility for two-way travel between the main batteries and spare batteries is not considered, nor that the latter help the main ones in the event of being overcharged.

EXPLANATION OF THE INVENTION

It is therefore interesting to provide a system of managing power supply systems which is more complete and open regarding its operation, allowing for a two-way direction among its different elements, as well as different paths, by means of the most suitable switching devices, depending on the necessities (time, charge, etc.) Of the electrical connection to be established and maintained.

In a first aspect, the present invention relates to a system of active equalization between power supply systems sharing a rechargeable electrical power storage device applicable to an automotive vehicle, comprising the combination of:

at least a first and a second electrical system, including a first and a second electrical power source, respectively, for feeding at least one electrical device of said automotive vehicle, at least one rechargeable electrical power storage device, shared by said electrical systems, detection means for detecting at least the current circulating between said first and second electrical systems, said electrical systems and said rechargeable electrical power storage device, which is at least one in number, and said electrical systems and said electrical device, which is at least one in number, and the voltage in said electrical power sources of said first and second electrical systems and in said rechargeable storage device, at least one switching assembly associated to each of said first and second electrical systems, allowing the rechargeable electrical power storage device to electrically connect with either of said electrical systems, or with both, or allowing said electrical systems to connect with each other, and an electronic system associated to at least said detection means and to said switching assemblies, which are at least two in number, and which are controlled by the former.

Each of said switching assemblies comprises, connected in parallel, an one-way switching device of a first type, which is actuated by said electronic system when only one transient electrical connection not exceeding a predetermined time period from the rechargeable electrical power storage device is required, and a two-way switching device of a second type, which is actuated by said electronic system when an electrical connection of a duration exceeding that of said predetermined time period is required, the electronic system being adapted for determining which elements of the system, namely the rechargeable electrical power storage device, the first or second electrical system, need to be connected with each other and for how long.

The electronic system is adapted for detecting, due to said detection means, different system necessities, whether it is that the rechargeable electrical power storage device, generally a battery, needs to be recharged, that an electrical system is in a transient overload situation or one of longer duration, or that both situations occur at the same time. In each case the electronic system will suitably act, actuating at least one of the switching devices of the first type for said predetermined time period, in case of needing only one transient electrical connection from the battery to at least one of the electrical systems to help it feed the devices it is feeding, or actuating at least one of switching devices of the second type for the remaining cases, i.e. for recharging the battery from one of the electrical systems, helping, by means of the battery or one of the electrical systems, another one of the electrical systems in case that it is overloaded for a longer time than said predetermined time period, or recharging the battery while at the same time helping one of the electrical systems in an overload situation by means of another one of the electrical systems.

In a second aspect, the invention also relates to a method suitable for using at least part of the proposed system for helping one of the electrical systems feed an electrical device or electrical devices by means of said electrical power storage device, whether for a predetermined time period, through one of said switching devices of a first type, or for a longer time than said predetermined time period, through one of said switching devices of a second type.

The method is also suitable for using at least part of the proposed system both only to recharge said electrical power storage device by means of one of the electrical systems, through one of said switching devices of a second type, and to recharge said electrical power storage device while at the same time helping another one of the electrical systems which is in an overload situation by means of additionally actuating another switching device of a second type associated to said other electrical system.

BRIEF DESCRIPTION OF THE DRAWINGS

Other features of the invention will become clearer from the following description of an embodiment example illustrated in the attached drawings and which should be taken as an illustrative and non-limiting example. In the drawings.

DETAILED DESCRIPTION OF SEVERAL EMBODIMENT EXAMPLES

Figure 1:
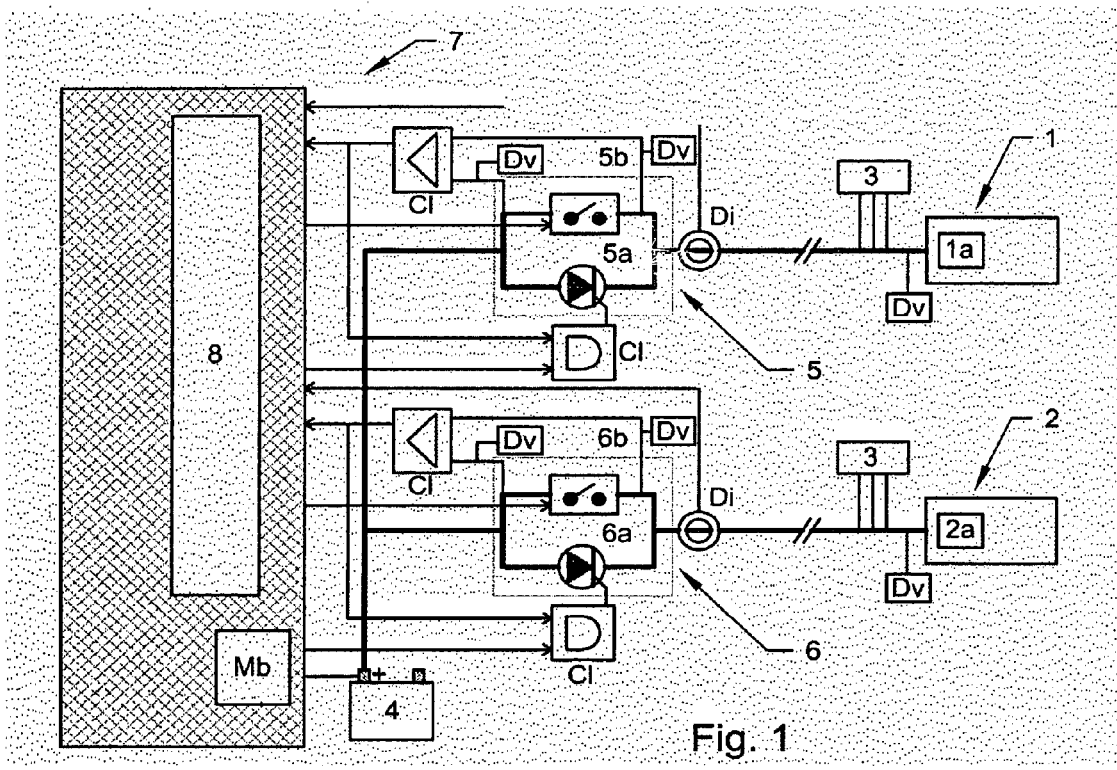
FIG. 1 schematically shows different elements forming the system proposed by the present invention, FIG. 2 also schematically shows part of the proposed system to illustrate the method proposed by the present invention.

As shown in FIG. 1, the system of active equalization between power supply systems sharing a rechargeable electrical power storage device applicable to an automotive vehicle proposed by the present invention comprises, for the preferred embodiment example shown, the combination of:

a first 1 and a second 2 electrical system, including first 1*a* and second 2*a* electrical power sources, respectively, for feeding an electrical device or electrical devices 3 of said automotive vehicle, a rechargeable electrical power storage device 4, preferably a spare battery 4, shared by said electrical systems 1, 2, detection means for detecting the current circulating between said first 1 and second 2 electrical systems, said electrical power storage device 4, and said electrical device or electrical devices 3, by means of corresponding current sensors Di, and the voltage in said electrical power sources 1*a*, 2*a* of said first 1 and second 2 electrical systems and in said storage device 4, by means of corresponding voltage sensors Dv, a switching assembly 5, 6 associated to each of said first 1 and second 2 electrical systems, allowing the rechargeable electrical power storage device 4 to electrically connect with either of said electrical systems 1, 2 or with both, or allowing said electrical systems 1, 2 to connect with each other, and an electronic system 7 associated to said detection means and to said switching assemblies 5, 6, which are controlled by the former.

Each of said switching assemblies 5, 6, comprises a switching device of a first type 5*a*, 6*a*, which is actuated by said electronic system 7 when only one transient electrical connection not exceeding a predetermined time period is required, and a switching device of a second type 5*b*, 6*b*, which is actuated by said electronic system 7 when an electrical connection of a duration exceeding that of said predetermined time period is required, the electronic system 7 being adapted for determining which elements of the system, namely the rechargeable electrical power storage device 4, the first 1 or second 2 electrical system, need to be connected with each other and for how long.

Said switching assemblies of said first switching assembly 5*a*, 6*a* and second switching assembly 5*b*, 6*b* types are connected in parallel, and the switching device of the first type 5*a*, 6*a* is one-way and is arranged such that it can conduct only from the rechargeable electrical power storage device 4, but not towards it. Said switching device of the first type 5*a*, 6*a* is a power semiconductor device, preferably a thyristor.

The switching device of the second type 5*b*, 6*b* is two-way in order to enable a flow of current in both directions and is designed for supporting said flow of current for a considerable time period and under demanding working conditions regarding intensity values to circulate therethrough, to which end a power switch is proposed as a switching device of the second type 5*b*, 6*b*, and preferably a bi-stable relay.

The electronic system 7 comprises a microprocessor 8 and a series of associated electronic and/or logic circuits Cl, such as can be seen in the figures.

The invention also proposes a method using at least part of the proposed system in a first phase or transient phase for connecting the electrical storage device 4 with one of the electrical systems 1, 2 when it is overloaded only for a short time span. Specifically, said transient phase of said method comprises:

a) detecting that at least one of said electrical systems 1, 2 is incapable of providing by itself the voltage and/or intensity required by at least one electrical device 3 it feeds, b) detecting that said rechargeable electrical power storage device 4 has a voltage exceeding that of said electrical power source 1*a*, 2*a* of said detected electrical system 1, 2, and c) actuating one of said switching devices of a first type 5*a*, 6*a* to electrically connect said rechargeable electrical power storage device 4 with said electrical system 1, 2 detected for a predetermined time period for helping the detected electrical system 1, 2 feed said electrical device 3.

Figure 2:
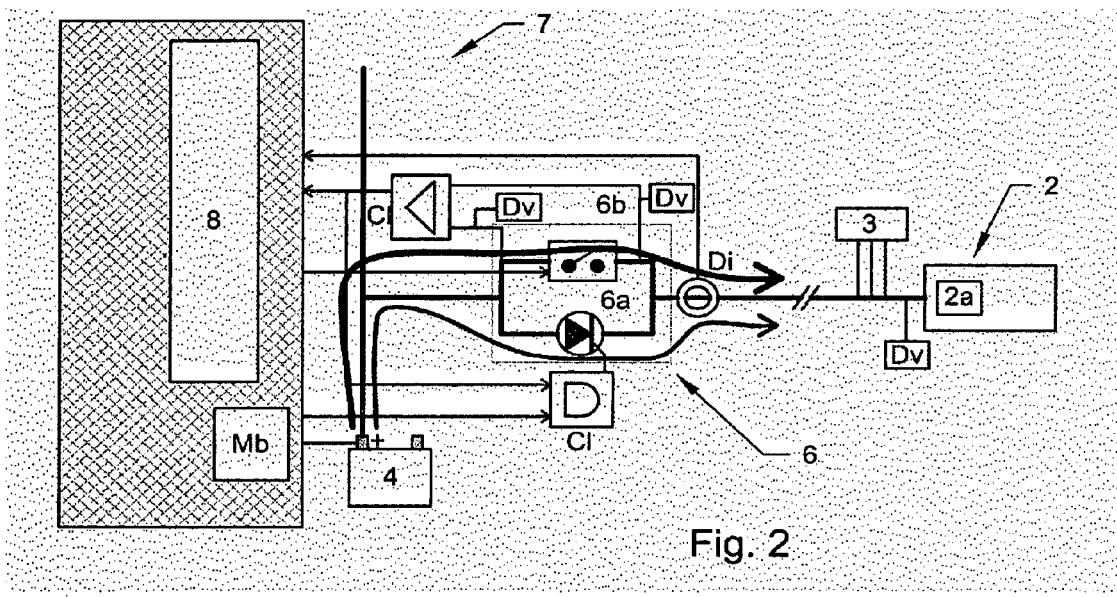

The flow of current caused by said step c) is indicated by the fine arrow in FIG. 2.

To carry out, for example, said transient phase of the proposed method, the electronic system 7 is adapted for detecting, due to said detection means, that at least one of the electrical systems 1, 2 is incapable of providing by itself the voltage and/or intensity required by the electrical device 3 (or electrical devices) it feeds, for detecting that the voltage of said rechargeable electrical power storage device 4 is higher than that of the electrical power source 1*a*, 2*a* of said detected electrical system 1, 2 and adapted for, after said detections, actuating at least one of the switching devices of the first type 5*a*, 6*a* to connect the rechargeable electrical power storage device 4 with said detected electrical system 1, 2, which is at least one in number, for said predetermined time period.

When the rechargeable electrical power storage device 4 is electrically connected through the switching device of the first type 5*a*, 6*a* with the electrical system 1, 2 detected as incapable of providing by itself the voltage and/or intensity required by the electrical device 3 it feeds, the switching device of the first type 5*a*, 6*a* is adapted to stop conducting when the intensity circulating therethrough tries to change the direction and/or when the voltage at its input decreases to a value equal to or lower than that of the voltage at its output. Thereby it is ensured that in the event that the voltage in the rechargeable electrical power storage device 4 decreases to below that of the electrical power source 1a, 2a to which it is helping to feed its load 3, the situation of said source 1a, 2a is not worsening, reversing the flow of current between both of them.

The voltage in the rechargeable electrical power storage device 4 could recover its nominal value and again try helping the overloaded electrical system 1, 2 to bear its load 3 by means of the automatic actuation of the switching device of the first type 5a, 6a, to immediately afterwards unload again and stop conducting again, entering in a type of unwanted loop which would cause an inefficient operation and unwanted pressures in said switching device 5a, 6a. To prevent said loop, in one embodiment example the electronic system 7 is adapted for sending a disabling signal though part of said logic circuitry Cl to said switching device of the first type 5a, 6a which has stopped conducting when, due to the fact that the voltage of the detected electrical system 1, 2 has increased to above the voltage of the rechargeable electrical power storage device 4 and has again decreased a determined number of times, this device has again started conducting and stopped conducting said determined number of times.

In another embodiment example said unwanted loop will be prevented in a more immediate manner, to which end the electronic system 7 is adapted for sending a disabling signal to said switching device of the first type 5a, 6a which has stopped conducting, immediately after the latter has stopped conducting, without waiting for it to enter into said loop.

Preferably, part of said logic circuitry Cl included in the electronic system 7 is responsible for actuating the switching device of the first type 5a, 6a in response to signals representative of a difference between the voltage in the electrical power source 1a, 2a of each electrical system 1, 2 and the voltage in the storage device 4, when said difference is due to the fact that the voltage in the electrical power source 1a, 2a decreases to below that of the storage device 4, which is an unequivocal indication that said electrical power source 1a, 2a, is being subjected to a great power demand. In the preferred case shown in the attached figures, said actuation will occur by means of sending a suitable signal to the gate thereof. That is to say that what causes the thyristor to actuate for helping one of the electrical systems 1, 2 feed its load 3 is the fact that said voltages become unequal, due to the fact that the voltage in its respective electrical power source 1a, 2a decreases. As a result, in the present specification, the system proposed has been called system of active equalization between two or more power supply systems, since essentially the objective is to compensate said voltage inequality, i.e. to equalize them, by means of certain associated "intelligence" making decisions to enable and/or actuate the thyristors 5a, 6a and/or switches 5b, 6b, respectively.

A second phase of the proposed method considers helping, by means of the electrical power storage device 4, one of the electrical systems 1, 2 in bearing a load caused by the electrical device 3 (or electrical devices) it feeds when the latter is maintained in time in a manner which can no longer be considered transient. To that end the proposed method furthermore comprises:

d) actuating a switching device of a second type 5b, 6b to electrically connect said rechargeable electrical power storage device 4 with said electrical system 1, 2 detected for a longer time period than said predetermined time, if after said predetermined time it is still incapable of providing by itself the voltage and/or intensity required by the electrical device 3 it feeds, to continue helping the detected electrical system 1, 2 feed the electrical device 3.

The flow of current caused by said step d) is indicated by the thick arrow in FIG. 2, wherein the rechargeable electrical power storage device 4 is specifically shown as a battery 4 which is helping the second electrical system 2a through its respective switching device of a second type 6b.

To be able to carry out, for example, said step d) of the method, the electronic system 7 is adapted for actuating at least one of the switching devices of the second type 5b, 6b to connect the rechargeable electrical power storage device 4 with said detected electrical system 1, 2, which is at least one in number, when, after said predetermined time period it detects that it is still incapable of providing by itself the voltage and/or intensity required by the electrical device 3 it feeds, which is at least one in number.

The switching device of the first type 5a, 6a is adapted to stop conducing when the switching device of the second type 5b, 6b conducts. In the preferred case shown in the figures in which such device 5a, 6a is a thyristor, this is explained due to the fact that when the switching device of the second type 5b, 6b connected in parallel to thyristor 5a, 6a starts conducting, the voltage between the terminals of the thyristor 5a, 6a approximately equals zero, which is lower than its breakover voltage threshold, causing the latter to automatically stop conducting.

Even so, and for greater safety, the electronic system 7 is adapted for sending a disabling signal to the gate of the thyristor 5a, 6a when it detects that the switching device of the second type 5b, 6b is conducting, to prevent accidental actuations of the thyristor 5a, 6a due to possible transient parasitic effects.

When the rechargeable electrical power storage device 4 is electrically connected through at least one of the switching devices of the second type 5b, 6b with said electrical system 1, 2 detected as incapable of providing by itself the voltage and/or intensity required by the electrical device 3 it feeds, the electronic system 7 is adapted for deactivating said switching device of the second type 5b, 6b when it detects that the intensity circulating between the rechargeable electrical power storage device 4 and the detected electrical system 1, 2 changes direction, the resultant being a current entering into the rechargeable electrical power storage device 4, which is canceled by means of said deactivation. This thereby achieves, in the similar manner to that previously explained for the transient electrical connection phase, that in the event that the voltage in the rechargeable electrical power storage device 4 decreases to below that of the electrical power source 1a, 2a which it is helping feed its load 3, the situation of said source 1a, 2a does worsen by reversing the flow of current between both of them. Just as in said transient phase, it is prevented from entering into the unwanted loop explained above by means of said deactivation.

For the preferred case in which the power storage device 4 is a battery 4, a correct monitoring thereof could more efficiently prevent said unwanted loop, since a decrease in the voltage of the battery 4 would be rapidly detected, all of the switching devices of the first type 5a, 6a (preferably thyristors) then being immediately deactivated and allowing only one of the switching devices of the second type 5b, 6b of one of the electrical systems 1, 2 to be actuated to recharge the battery 4, when possible, as is explained below by explaining in detail other steps of the method proposed by the present invention. To achieve said monitoring, for the preferred embodiment example shown in attached figures, the system proposed by the present invention comprises suitable battery monitoring means Mb.

The invention also proposes other additional steps of the proposed method, in which at least part of the proposed system is used at least for recharging the rechargeable electrical storage device 4 or spare battery 4, by means of one of the electrical systems 1, 2. Specifically said method furthermore comprises:

e) detecting that the voltage in said rechargeable electrical power storage device 4 has decreased to below that of the electrical power source 1*a*, 2*a*, of said electrical system 1, 2 detected as incapable of providing by itself the voltage and/or intensity required by the electrical device 3 it feeds, f) detecting that one of said electrical systems 1, 2 is capable of recharging said rechargeable electrical power storage device 4, and g) actuating one of said switching devices 5*b*, 6*b* of a second type of said electrical system 1, 2 detected in f) to electrically connect the latter with the rechargeable electrical power storage device 4 in a direction opposite to that of said steps c) and d), and recharge it.

Figure 3:
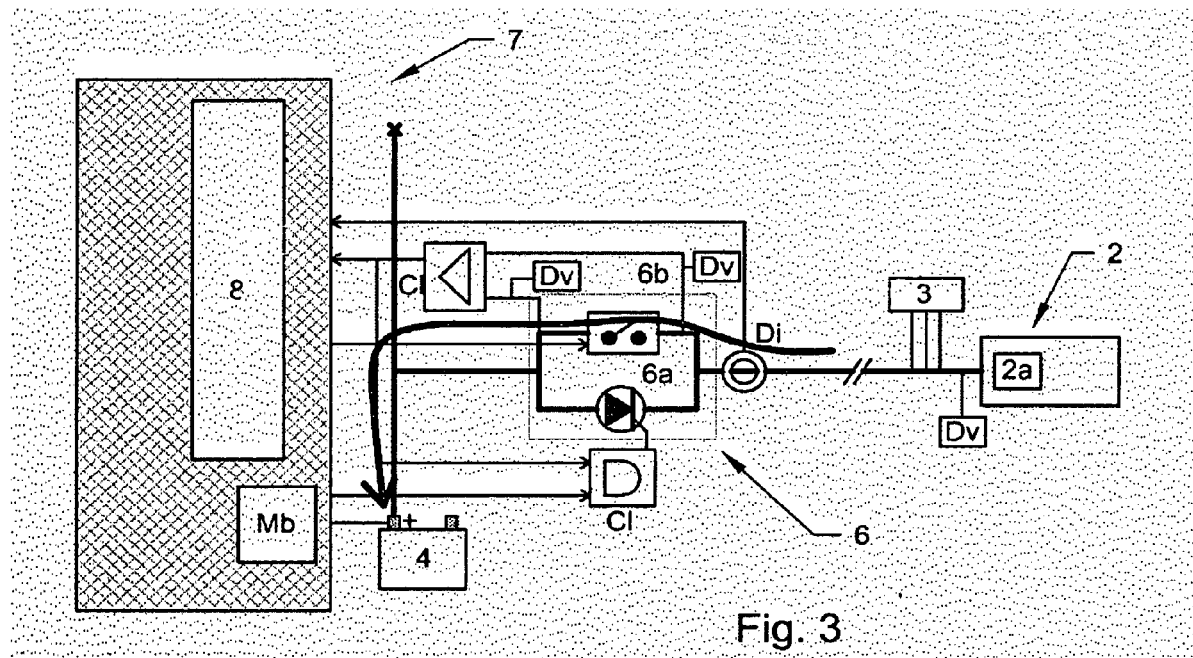
FIG. 3 illustrates part of the method proposed by the present invention by means of showing part of the system shown in FIG. 1.

The flow of current caused by said step g) of the method is indicated by the arrow in FIG. 3, wherein for the embodiment example shown, said electrical system detected in f) is the second electrical system 2, although it could be any one that is capable of recharging the rechargeable electrical power storage device 4.

The previous steps e) to f) of the method, i.e. recharging the rechargeable electrical power storage device 4, could not necessarily precede the steps a) to d), and therefore could be carried out at any moment in which the rechargeable electrical power storage device 4 needs to be recharged, even though the latter had not previously been used for helping one of the electrical systems 1, 2 in bearing its overload.

To carry out previous steps e) to g) of the method, among others, preceded or not by steps a) to d), the electronic system 7 is adapted for detecting, due to detection means, that the rechargeable electrical power storage device 4 needs to be recharged, and for detecting and finding out which of the electrical systems 1, 2 is more capable of recharging it and consequently choosing it, and adapted for actuating at least one of the switching devices of the second type 5*b*, 6*b* after said detections to connect said chosen electrical system 1, 2 with the rechargeable electrical power storage device 4 or spare battery 4.

For the purpose of preventing the flow of current from circulating undesirably from one electrical system to another when one of them is charging the spare battery 4, the electronic system 7 is adapted for sending a disabling signal to the switching device of the first type 5*a*, 6*a* when it detects that the spare battery 4 needs to be recharged and before actuating the switching device of the second type 5*b*, 6*b*, thus ensuring that an electrical connection is established between only the chosen electrical system 1, 2 and the battery 4 only through the switching device of the second type 5*b*, 6*b* associated to said chosen electrical system 1, 2.

The proposed method furthermore considers the possibility of not only recharging the spare battery 4 by means of the electrical systems 1, 2 but also helping another electrical system or other electrical systems 1, 2, if possible, feed its respective electrical devices 3. To that end the method furthermore comprises:

h) detecting that another one of said electrical systems 1, 2 is incapable of providing by itself the voltage and/or intensity required by the electrical device 3 it feeds, i) detecting that said electrical system 1, 2 detected in f), in addition to recharging the rechargeable electrical power storage device 4, is capable of helping said other electrical system 1, 2 detected in h) feed the electrical device 3 it feeds, and j) actuating, in addition to said switching device actuated in g), one of said switching devices of a second type 5*b*, 6*b* of said other electrical system 1, 2 to electrically connect the electrical system 1, 2 detected in f) with the rechargeable electrical power storage device 4, to recharge it, and with the electrical system 1, 2 detected in h) to aid it feed the electrical device 3 it feeds.

Figure 4:
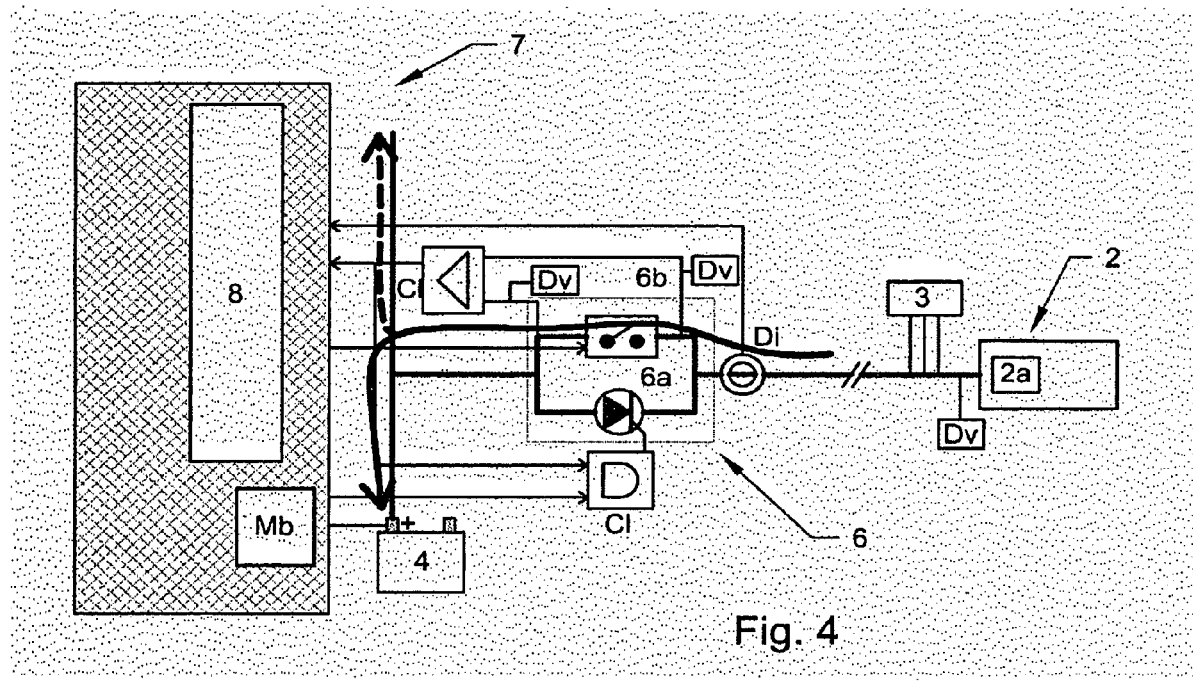
FIG. 4 shows, similarly to FIG. 3, another embodiment of the proposed method.

FIG. 4 shows the flow of currents caused by said step j), the flow going towards the rechargeable electrical power storage device 4 is indicated by means of a thick arrow, and, for the embodiment example shown, the one going from the first electrical system 1 to the second electrical system 2 is indicated by means of a broken arrow. In said Figure, it is considered that the overloaded system is the second electrical system 2, and that the system capable of bearing said overload in addition to recharging the rechargeable electrical power storage device 4 is the first electrical system 1, although the choice of either system when said step j) is shown has been made merely by way of a non-limiting indication.

Steps h) to j) could be independent for other embodiment examples, i.e. not being preceded by steps a) to g), if recharging the rechargeable electrical power storage device 4 is needed at the same time as helping one of the electrical systems 1, 2 in bearing a possible overload without any of the steps, or at least not all of them, having taken place.

For example, to be able to carry out said steps h) to j) of the proposed method, the electronic system 7 is adapted for additionally detecting that another one of the electrical systems 1, 2 is incapable of providing by itself the voltage and/or intensity required by the electrical device 3 it feeds, and that at least said electrical system 1, 2 chosen for recharging the rechargeable electrical power storage device 4 is also capable of helping said other electrical system 1, 2 feed its respective electrical device, and adapted for also actuating the switching device of the second type 5*b*, 6*b* associated to said other electrical system 1, 2 after said detections, to connect both electrical systems 1, 2 with each other and with the rechargeable electrical power storage device 4.

The electronic system 7 is adapted for sending an alarm signal representative of an overload when it detects, due to the detection means, that the rechargeable electrical power storage device 4 needs to be recharged, and that neither of the first 1 and second 2 electrical system is capable of recharging it.

Although the explications of the proposed method and system have been closely linked in the present specification, they are independent, and the method could be carried out using another system different from the one proposed, provided it has at least the necessary elements to carry it out, and the system proposed by the present invention could be used to carry out other methods different from that proposed.

A person skilled in the art could introduce changes and modifications in the described embodiment examples without exceeding the scope of the invention as it is defined in the attached claims.

What is claimed is:

1. A system of active equalization between power supply systems sharing a rechargeable electrical power storage device, applicable to an automotive vehicle, comprising the combination of:

at least a first (1) and a second (2) electrical system, including first (1*a*) and second (2*a*) electrical power sources, respectively, for feeding at least one electrical device (3) of said automotive vehicle, at least one rechargeable electrical power storage device (4) shared by said electrical systems (1, 2), detection means for detecting at least the current circulating between said first (1) and second (2) electrical systems, said electrical systems (1, 2) and said rechargeable electrical power storage device (4), which is at least one in number, and said electrical systems (1, 2) and said electrical device (3) which is at least one in number, and the voltage in said electrical power sources (1*a*, 2*a*) of said first (1) and second (2) electrical systems and in said rechargeable storage device.

at least one switching assembly (5, 6) associated to each of said first (1) and second (2) electrical systems, allowing the rechargeable electrical power storage device (4) to electrically connect with either of said electrical systems (1, 2), or with both, or allowing said electrical systems (1, 2) to connect with each other, and an electronic system (7) associated to at least said detection means and to said switching assemblies (5, 6), which are at least two in number, and which it controls, wherein each of said switching assemblies (5, 6) comprises a switching device of a first type (5*a*, 6*a*), which is actuated by said electronic system (7) when only one transient electrical connection not exceeding a predetermined time period is required, and a switching device of a second type (5*b*, 6*b*), which is actuated by said electronic system (7) when an electrical connection of a duration exceeding that of said predetermined time is required, the electronic system (7) being adapted for determining which elements of the system, namely the rechargeable electrical power storage device (4), first (1) or second (2) electrical system, need to be connected with each other and for how long;

further characterized in that said switching devices of said first (5*a*, 6*a*) and second (5*b*, 6*b*) types are connected in parallel, in that the switching device of the first type (5*a*, 6*a*) is one-way and is arranged such that it can conduct only from the rechargeable electrical power storage device (4) but not towards it, and in that the switching device of the second type (5*b*, 6*b*) is two-way.

2. A system according to claim 1, characterized in that the electronic system (7) is adapted for detecting, due to said detection means, that at least one of the electrical systems (1, 2) is incapable of providing by itself the voltage and/or intensity required by the electrical device (3) it feeds, which is at least one in number, detecting that the voltage of said rechargeable electrical power storage device (4) is higher than that of said electrical power source (1*a*, 2*a*) of said detected electrical system (1, 2), and adapted for actuating at least one of the switching devices of the first type (5*a*, 6*a*) after said detections to connect the rechargeable electrical power storage device (4) with said detected electrical system (1, 2), which is at least one in number, for said predetermined time period.

3. A system according to claim 2, characterized in that the electronic system (7) is adapted for actuating at least one of the switching devices (5*b*, 6*b*) of the second type to connect the rechargeable electrical power storage device (4) with said detected electrical system (1, 2), which is at least one in number, when after said predetermined time period it detects that it is still incapable of providing by itself the voltage and/or intensity required by the electrical device (3) which it feeds, which is at least one in number.

4. A system according to claim 3, characterized in that the switching device of the first type (5*a*, 6*a*) is adapted to stop conducting when the switching device of the second type (5*b*, 6*b*) conducts.

5. A system according to claim 4, characterized in that the electronic system (7) is adapted for sending a disabling signal to the switching device (5*a*, 6*a*) of the first type (5*a*, 6*a*) when it detects that the switching device of the second type (5*b*, 6*b*) is conducting to prevent accidental actuations of the switching device of the first type (5*a*, 6*a*).

6. A system according to claim 1, characterized in that the electronic system (7) is adapted for detecting, due to said detection means, that the rechargeable electrical power storage device (4), which is at least one in number, needs to be recharged, and for detecting and finding out which of the electrical systems (1, 2) is more capable of recharging it and accordingly choosing it, and adapted for actuating at least one of the switching devices of the second type (5*b*, 6*b*) after said detections to connect said chosen electrical system (1, 2) with the rechargeable electrical power storage device (4).

7. A system according to claim 6, characterized in that the electronic system (7) is adapted for sending a disabling signal to the switching device of the first type (5*a*, 6*a*) when it detects that the rechargeable electrical power storage device (4) needs to be recharged and before actuating the switching device of the second type (5*b*, 6*b*).

8. A system according to claim 2, characterized in that the switching device of the first type (5*a*, 6*a*) is adapted, when the rechargeable electrical power storage device (4) is electrically connected through said switching device of the first type (5*a*, 6*a*) with said electrical system (1, 2) detected as incapable of providing by itself the voltage and/or intensity required by the electrical device (3) which it feeds, to stop conducting when the intensity circulating therethrough tries to change the direction, and/or the voltage at its input decreases to a value equal to or lower than that of the voltage at its output.

9. A system according to claim 3, characterized in that the electronic system (7) is adapted, when the rechargeable electrical power storage device (4) is electrically connected through at least one of the switching devices of the second type (5*b*, 6*b*), with said electrical system (1, 2) detected as incapable of providing by itself the voltage and/or intensity required by the electrical device (3) which it feeds, for deactivating said switching device of the second type (5*b*, 6*b*) when it detects that the intensity circulating between the rechargeable electrical power storage device (4) and the detected electrical system (1, 2) changes the direction, the resultant being a current entering into the rechargeable electrical power storage device (4).

10. A system according to claim 8, characterized in that the electronic system (7) is adapted for sending a disabling signal to said switching device of the first type (5*a*, 6*a*) which has stopped conducting when, due to the fact that the voltage of the detected electrical system (1, 2) has increased to above the voltage of the rechargeable electrical power storage device (4) and has again decreased a determined number of times, this device has again started conducting and stopped conducting said determined number of times.

11. A system according to claim 8, characterized in that the electronic system (7) is adapted for sending a disabling signal to said switching device of the first type (5*a*, 6*a*) which has stopped conducting immediately after the latter has stopped conducting.

12. A system according to claim 6, characterized in that the electronic system (7) is adapted for sending an alarm signal representative of an overload when it detects, due to the detection means, that the rechargeable electrical power storage device (4) needs to be recharged, and that neither of the first (1) and second (2) electrical systems is capable of recharging it.

13. A system according to claim 6, characterized in that the electronic system (7) is adapted for furthermore detecting that another one of the electrical systems (1, 2) is incapable of providing by itself the voltage and/or intensity required by the electrical device (3) which it feeds, and that at least said electrical system (1, 2) chosen for recharging the rechargeable electrical power storage device (4) is also capable of helping said other electrical system (1, 2) feed its respective electrical device (3), and adapted for also actuating the switching device of the second type (5b, 6b) associated to said other electrical system (1, 2) after said detections to connect both electrical systems (1, 2) with each other and with the rechargeable electrical power storage device (4).

14. A method of active equalization between power supply systems sharing a rechargeable electrical power storage device, applicable to an automotive vehicle, said power supply systems including at least a first (1) and a second (2) electrical system, including first (1a) and second (2a) electrical power sources, respectively, to feed at least one electrical device (3) of said automotive vehicle, characterized in that it comprises:
   a) detecting that at least one of said electrical systems (1, 2), which are at least two in number, is incapable of providing by itself the voltage and/or intensity required by at least one electrical device (3) which it feeds,
   b) detecting that said rechargeable electrical power storage device (4) has a voltage higher than that of said electrical power source (1a, 2a) of said detected electrical system (1, 2),
   c) actuating a switching device of a first type (5a, 6a), to electrically connect said rechargeable electrical power storage device (4) with said electrical system (1, 2) detected for a predetermined time period for helping the detected electrical system (1, 2) feed said electrical device (3), and
   d) actuating a switching device of a second type (5b, 6b) to electrically connect said rechargeable electrical power storage device (4) with said electrical system (1, 2) detected for a longer time period than said predetermined time period, if after said predetermined time period the detected electrical system (1, 2) is still incapable of providing by itself the voltage and/or intensity required by the electrical device (3) which it feeds, to continue helping the detected electrical system (1, 2) feed said electrical device (3).

15. A method according to claim 14, characterized in that it furthermore comprises:
   e) detecting that the voltage in said rechargeable electrical power storage device (4) has decreased to below that of the electrical power source (1a, 2a), of said electrical system (1, 2) detected as incapable of providing by itself the voltage and/or intensity required by the electrical device (3) which it feeds,
   f) detecting that one of said electrical systems (1, 2) is capable of recharging said rechargeable electrical power storage device (4), and
   g) actuating one of said switching devices (5b, 6b) of a second type of said electrical system (1, 2) detected in f) to electrically connect it with the rechargeable electrical power storage device (4) in a direction opposite to that of said steps c) and d), and recharge it.

16. A method according to claim 15, characterized in that it furthermore comprises:
   h) detecting that another one of said electrical systems (1, 2) is incapable of providing by itself the voltage and/or intensity required by the electrical device (3) which it feeds,
   i) detecting that said electrical system (1, 2) detected in f) is capable of helping said other electrical system (1, 2) detected in h) feed the electrical device (3) which it feeds, in addition to recharging the rechargeable electrical power storage device (4), and j) actuating, in addition to said switching device actuated in g), one of said switching devices of a second type (5b, 6b) of said other electrical system (1, 2) to electrically connect the electrical system (1, 2) detected in f) with the rechargeable electrical power storage device (4) to recharge it, and with the electrical system (1, 2) detected in h) for helping it feed the electrical device (3) which it feeds.

* * * * *